(12) United States Patent
Blendermann et al.

(10) Patent No.: US 6,317,814 B1
(45) Date of Patent: Nov. 13, 2001

(54) METHOD FOR SELECTIVELY STORING REDUNDANT COPIES OF VIRTUAL VOLUME DATA ON PHYSICAL DATA STORAGE CARTRIDGES

(75) Inventors: Stephen H. Blendermann; Alan Ray Sutton, both of Boulder, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 09/109,318

(22) Filed: Jul. 1, 1998

(51) Int. Cl.[7] ..................................................... G06F 12/00
(52) U.S. Cl. ........................... 711/162; 711/203; 707/204
(58) Field of Search ..................................... 711/162, 161, 711/152; 395/500; 369/34; 707/204

(56) References Cited

U.S. PATENT DOCUMENTS

| 4,467,421 | 8/1984 | White . | |
|---|---|---|---|
| 5,287,459 | * 2/1994 | Gniewek | 369/34 |
| 5,805,864 | * 9/1998 | Carlson et al. | 395/500 |
| 5,875,478 | * 2/1999 | Blumenau | 711/162 |
| 5,909,700 | * 6/1999 | Bitner et al. | 711/162 |
| 5,926,834 | * 7/1999 | Carlson et al. | 711/152 |
| 5,943,688 | * 8/1999 | Fisher et al. | 711/162 |
| 6,014,675 | * 1/2000 | Brewer et al. | 707/204 |

* cited by examiner

Primary Examiner—Do Hyun Yoo
Assistant Examiner—Fred F. Tzeng
(74) Attorney, Agent, or Firm—Brooks & Kushman P.C.

(57) ABSTRACT

The present invention provides a method for selectively storing duplicate copies of a virtual data volume file onto more than one multiple volume cartridge (MVC) based upon a copy indicator provided with a data volume file at the meta data file level. If access is subsequently lost to the main MVC as a result of hardware or tape failure, any copied data stored thereon is automatically recovered by accessing an MVC holding a copy of the data volume file. Thus, the amount of data which could be possibly lost is minimized without otherwise compromising the efficiency and flexibility provided by a multiple virtual volume data storage arrangement.

4 Claims, 2 Drawing Sheets ically to multiple volume cartridge (MVC) devices, and more particularly to an arrangement for storing virtual volume data which minimizes the amount of data which could be lost due to a sudden inability to access a particular MVC.

METHOD FOR SELECTIVELY STORING REDUNDANT COPIES OF VIRTUAL VOLUME DATA ON PHYSICAL DATA STORAGE CARTRIDGES

TECHNICAL FIELD

The present invention relates generally to multiple volume cartridge (MVC) devices, and more particularly to an arrangement for storing virtual volume data which minimizes the amount of data which could be lost due to a sudden inability to access a particular MVC.

BACKGROUND ART

Generally, automated cartridge systems (ACS) provide a mechanism by which multiple users in a data processing system can have common access to multiple data storage subsystems, such as different multiple magnetic tape cartridge devices. In such a conventional system, physical data files generated by remote user computer systems are stored individually on different tape cartridges using an addressing arrangement. With such an arrangement, the potential loss of stored data is minimized if the system suddenly loses the ability to access a given tape cartridge as a result of hardware or tape failure, i.e., only the single data file stored on the inaccessible tape is likely to be lost because that is all that is stored on any individual tape cartridge.

However, recently efficiency in mass data access and storage utilization has been improved by employing a disk buffer between the remote users and a set of multiple volume cartridges (MVC) to create virtual data volumes in place of the actual transferred data files. Efficiency and utilization are increased in such a virtual volume arrangement because multiple virtual volumes can be selectively stored on a single cartridge to maximize space utilization. Such an arrangement is described in commonly owned copending U.S. patent application Ser. No. 09/110,217, filed on Jul. 8, 1988 now patentented with U.S. Pat. No. 6,094.605 and incorporated incorporated by reference herein.

While such a multiple virtual volume arrangement significantly improves utilization and throughput efficiency, the placement of multiple virtual volumes on a single cartridge has produced an undesirable side effect by increasing the amount of data at risk to loss if a MVC hardware or cartridge failure occurs. As a result, a need exists for an improved method for storing multiple virtual volumes which minimizes the amount of data which can be potentially lost without compromising the efficiency in space utilization otherwise provided.

DISCLOSURE OF THE INVENTION

It is therefore an object of the present invention to provide an improved method for storing multiple virtual data volumes to one of a plurality of multiple volume cartridges (MVC) which minimizes the amount of data which may be lost if a particular cartridge suddenly becomes inaccessible.

It is another object of the present invention to provide a method for storing multiple virtual data volumes to one of a plurality of MVCs which allows selective copying of a virtual volume data file to more than one cartridge to minimize the amount of data which could be potentially lost if a particular cartridge suddenly becomes inaccessible.

It is still another object of the present invention to provide a method for storing multiple virtual data volumes to one of a plurality of MVCs which allows a user to selectively control copying of a virtual volume data file to different cartridges in order to minimize the amount of data which could be potentially lost if a particular cartridge suddenly becomes inaccessible.

In accordance with these and other objects, the present invention provides a method for selectively storing multiple virtual data volumes on at least one of a plurality of multiple volume cartridges (MVC) including the steps of a remote user selectively requesting at a data file level that a data volume file to be copied and stored on more than one MVC, storing all data volume files transferred from remote computer systems in a disk buffer located between the remote users and the plurality of MVCs, and automatically determining via a control subsystem whether a received data volume file has been designated for copying to at least one additional MVC. If a received data volume file has been designated for copying, the data volume stored in the disk buffer is written as a virtual data volume to more than one MVC before the data volume file is removed from the disk buffer. A record is maintained by the control subsystem indicating all MVC locations for each stored virtual volume file.

With such an arrangement, a user is advantageously permitted to selectively designate redundant back-up copying of a data volume file at the time of data transfer. If access is lost to a particular MVC, any copied data stored thereon is automatically recovered by accessing an MVC holding a copy of the data volume file. This in turn minimizes the amount of data which could be possibly lost without otherwise compromising the efficiency and flexibility provided by a multiple virtual volume data storage arrangement.

These and other objects, features, and advantages of the present invention will be readily apparent from the following detailed description of the best mode for carrying out the invention when taken in connection with the accompanying drawings.

BEST MODE FOR CARRYING OUT THE INVENTION

Figure 1:
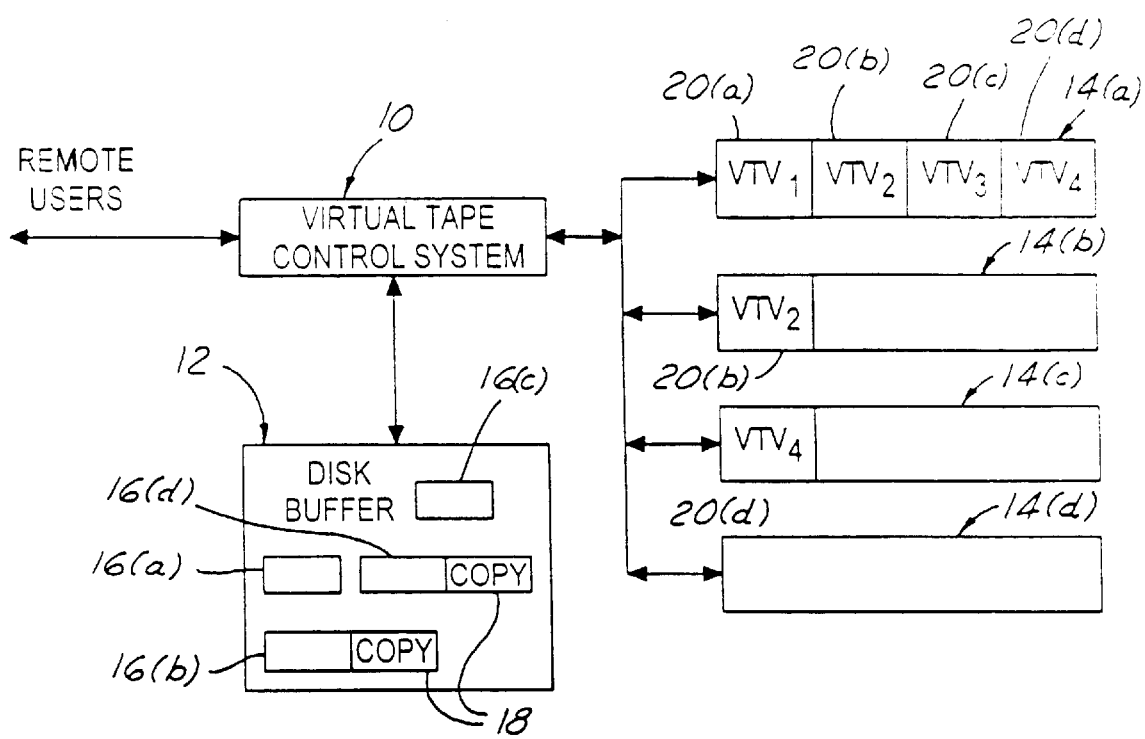
FIG. 1 is a block diagram illustrating a data storage system employing selective virtual volume copying in accordance with the present invention.

The overall method of the present invention will now be described in connection with FIGS. 1 and 2. More specifically, the present invention includes a suitable storage control subsystem 10 programmed to store all incoming data volume files transferred from remote user computer systems in a disk buffer 12 as denoted at block 100. At block 102, control subsystem 10 automatically analyzes each received data file to determine whether the remote user has associated particular copy attributes within a meta file external to the data file. Such associating of copy attributes or indicators can be carried out in any manner known to one of ordinary skill in the art. The associating of such copy attributes provides an indication from the remote user that the received data file is to be duplicated by copying and redundantly storing the data file on more than one of the plurality of available multiple volume cartridges (MVC) 14(a)–14(n).

If the associated copy attributes are detected, as indicated at block 104, control subsystem automatically writes the data stored in disk buffer 12 as an associated virtual volume to more than one MVC 14 when prompted during the normal storage phase portion of the storage control routine. Otherwise, the associated virtual volume is only written to a single MVC as denoted at block 106.

Figure 2:
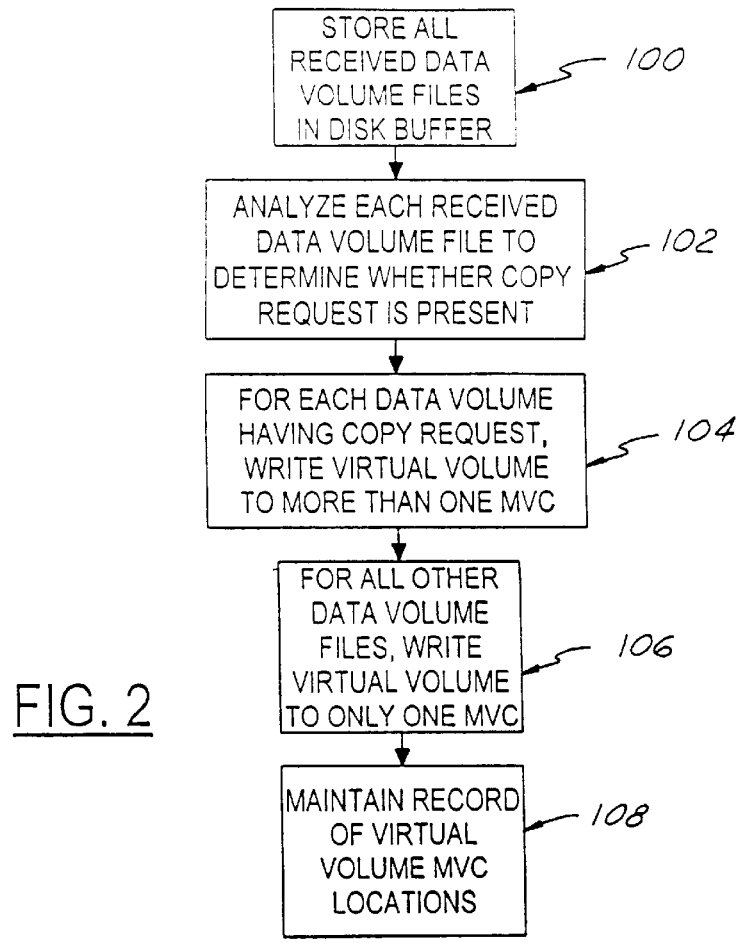
FIG. 2 is a flowchart showing the overall process of the present invention.

For illustrative purposes, FIG. 1 shows receipt of four different data volume files 16(a)–16(d) from one or more remote users. As shown, data volumes files 16(b) and 16(d) have been tagged with a copy indicator 18 which indicates that duplicate storage is desired for these two data volume files. As further shown, each of the data volume files is written as a virtual tape volume (VTV) 20 associated with each data volume file 16 from disk buffer 12 to a selected MVC 14(a) in accordance with a predetermined ordering protocol, such as based on an predetermined expiration date, or a conventional first-in-first-out (FIFO) sequence.

In addition, the VTVs associated with data volume files 16(b) and (d) to be duplicated are individually written to different respective MVCs 14(b) and 14(c). Each data volume file 16 is individually cleared from disk buffer 12 after being written to the different MVCs. Alternatively, both VTVs could be written to the same back-up MVC 14(b). As indicated at block 108, control subsystem 10 maintains a record of each MVC location for all stored VTVs.

Figure 3:
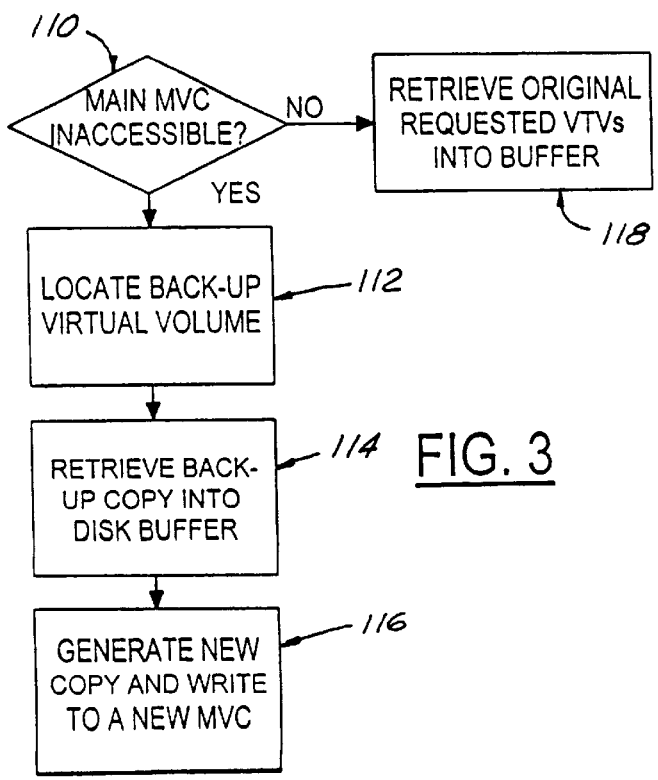
FIG. 3 is a flowchart showing the back-up copy retrieval process of the present invention.

Referring now to FIG. 3, if access to MVC 14(a) subsequently becomes impossible such as due to a hardware or tape failure as denoted at block 110, control subsystem 10 will automatically locate the backup MVC location of any redundantly stored VTVs at block 112, retrieve all requested VTVs into buffer 12 at block 114, and regenerate new copies of the VTVs by writing the data from buffer 12 to a new MVC 14 at block 116. On the other hand, if the main MVC is accessible at block 110, then the original set of requested VTVs are retrieved into the buffer 12 as shown at block 118.

Thus, the present invention advantageously provides a method for storing data volume files to a MVC which allows a user to select desired data volume files for redundant/back-up storage on more than one MVC, and which automatically retrieves redundant copies to regenerate any data stored on an inaccessible MVC. Through selective redundancy and automatic regeneration, the present invention minimizes the amount of data which could be potentially lost if the system experiences hardware or tape failure.

While the best mode for carrying out the invention has been described in detail, those familiar with the art to which this invention relates will recognize various alternative designs and embodiments for practicing the invention as defined by the following claims.

What is claimed is:

1. A method for selectively storing multiple virtual data volumes on at least one of a plurality of multiple volume cartridges comprising:

selectively designating at a data file level a data volume file to be copied and stored on more than one multiple volume cartridge;

storing all data volume files transferred from one or more remote computer systems in a disk buffer located between the remote computer systems and the plurality of multiple volume cartridges;

automatically determining whether a received data volume file has been designated for copying to more than one multiple volume cartridges;

writing the data volume files stored in the disk buffer to a first one of the multiple volume cartridges as virtual data volumes; and copying the virtual data files corresponding to any data volume files designated for duplicate storage to at least a second multiple volume cartridge before removing the copied data files from the disk buffer.

2. The method of claim 1 further comprising maintaining a record indicating all multiple volume cartridge locations for each stored virtual data file.

3. The method of claim 1 wherein selectively designating at a data file level comprises a remote user associating copy attributes in a meta file for the selected data file.

4. A method for selectively storing multiple virtual data volumes on at least one of a plurality of multiple volume cartridges comprising:

selectively designating at a data file level a data volume file to be copied and stored on more than one multiple volume cartridge;

storing all data volume files transferred from one or more remote computer systems in a disk buffer located between the remote computer systems and the plurality of multiple volume cartridges;

automatically determining whether a received data volume file has been designated for copying to more than one multiple volume cartridges;

writing the data volume files stored in the disk buffer to a first one of the multiple volume cartridges as virtual data volumes;

copying the virtual data files corresponding to any data volume files designated for duplicate storage to at least a second multiple volume cartridge before removing the copied data files from the disk buffer;

maintaining a record indicating all multiple volume cartridge locations for each stored virtual data file;

detecting that the first multiple volume cartridge is inaccessible;

automatically locating and retrieving into the disk buffer a duplicate copy of the virtual data files stored on the inaccessible cartridge; and writing new copies of the retrieved virtual data files to an additional multiple volume cartridge.

* * * * *